United States Patent [19]

Krasicki

[11] Patent Number: 4,659,896
[45] Date of Patent: Apr. 21, 1987

[54] METHOD AND APPARATUS FOR DETECTING A BRAZE MELT

[75] Inventor: Eugene T. Krasicki, McCandless Township, Allegheny County, Pa.

[73] Assignee: Westinghouse Electric Corp., Pittsburgh, Pa.

[21] Appl. No.: 720,104

[22] Filed: Apr. 4, 1985

[51] Int. Cl.$^4$ ............................................. B23K 1/00
[52] U.S. Cl. .......................... 219/85 BM; 219/85 BA; 219/85 D; 219/85 M
[58] Field of Search .............. 219/85 R, 85 A, 85 BA, 219/85 BM, 85 D, 85 M, 110, 86.41, 91.1, 85 CA, 85 CM

[56] References Cited

U.S. PATENT DOCUMENTS

| | | | |
|---|---|---|---|
| 3,504,149 | 3/1920 | Dixon et al. | 219/85 A |
| 4,523,177 | 6/1985 | Driggers | 219/355 |
| 4,559,436 | 12/1985 | Roach et al. | 219/85 M |
| 4,572,938 | 2/1986 | Driggers et al. | 219/353 |
| 4,577,083 | 3/1986 | Carreira | 219/85 CM |

FOREIGN PATENT DOCUMENTS 49-27020  7/1974  Japan ................................. 219/85 D

*Primary Examiner*—Clifford C. Shaw
*Attorney, Agent, or Firm*—L. A. DePaul

[57] ABSTRACT

A method and apparatus for both implementing a braze melt and detecting the time, rate and direction of the braze melt along the longitudinal axis of the tube or sleeve being brazed. Generally, the invention comprises a radiant brazing heater having an electrical resistance coil assembly which serves the dual functions of providing a brazing heat onto a brazing material while simultaneously acting as an eddy current probe. In the preferred embodiment, the electrical resistance coil assembly consists of a pair of coils wound clockwise and counterclockwise, respectively, around the mandrel of the heater assembly. The invention further includes a control circuit having a mechanical relay for alternately switching the two coils of the coil assembly to a heater power source, and to an eddy current generator and detector circuit. The control circuit of the invention further includes a timing circuit for controlling the sequence of the switching operation of the mechanical relay, as well as a null command circuit for bringing the eddy current generator and detector to a null state every time the two coils are connected to the eddy current generator and detector circuit. The invention is particularly useful in brazing Inconel reinforcing sleeves within the heat exchange tubes of nuclear steam generators, where the utilization of the dual coils as a differential eddy current probe allows the operator to accurately determine when the brazing material which circumscribes the ends of the reinforcing sleeves melts, as well as the rate and direction of the braze melt.

33 Claims, 16 Drawing Figures

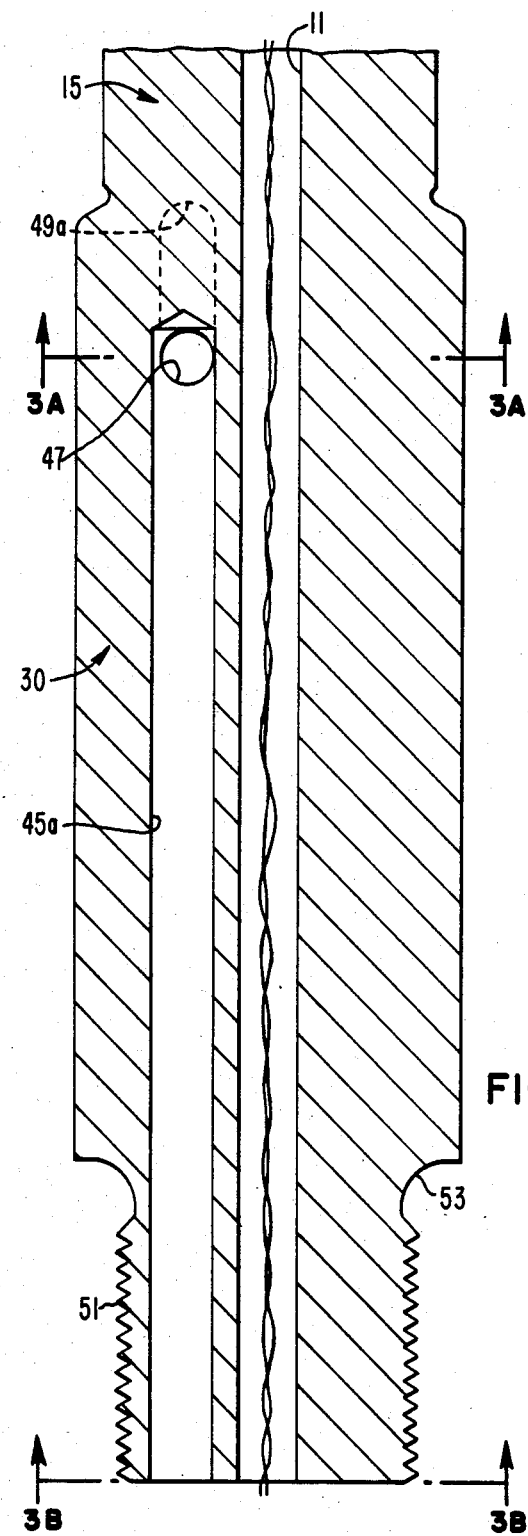
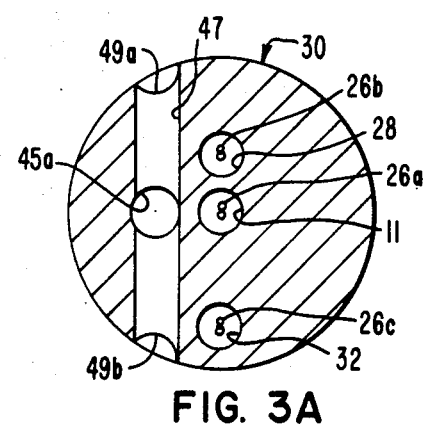
FIG. 3A
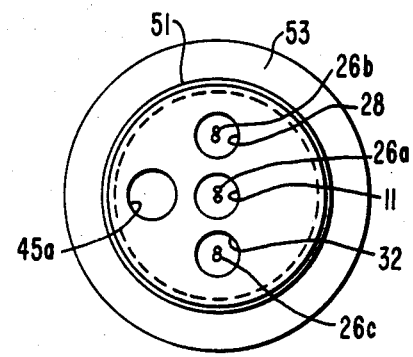
FIG. 3B
FIG. 2
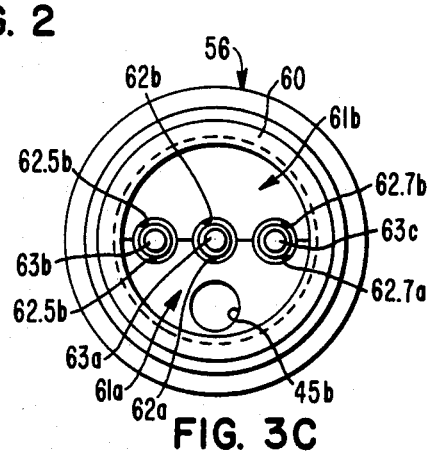
FIG. 3C

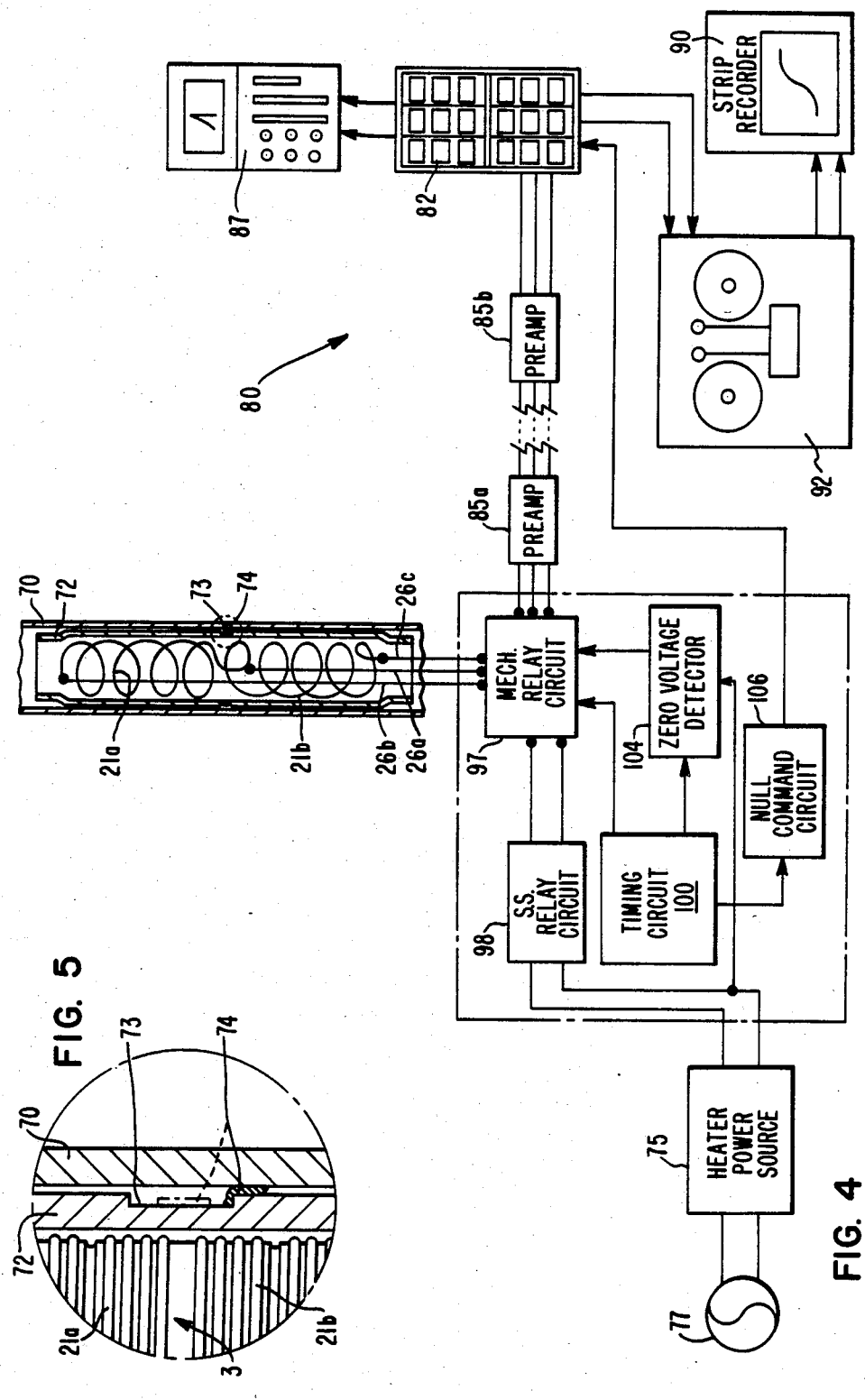

METHOD AND APPARATUS FOR DETECTING A BRAZE MELT

BACKGROUND OF THE INVENTION

1. Field of the Invention

This invention relates to a method and apparatus for both implementing a braze melt, and detecting when the braze melt occurs. Generally speaking, the invention comprises a radiant brazing heater having an electrical resistance coil assembly which serves the dual functions of providing a brazing heat onto a brazing material while simultaneously acting as an eddy current probe. The invention is particularly useful in brazing Inconel reinforcing sleeves within the heat exchange tubes of nuclear steam generators, where the utilization of the coil as an eddy current probe allows the operator to accurately determine when the brazing material surrounding the reinforcing sleeves melts.

2. Description of the Prior Art

Devices and processes for applying a brazing heat to the inside surfaces of conduits are known in the prior art. Such devices and processes are used to braze reinforcing sleeves within the heat exchange tubes of nuclear steam generators. In such prior art processes, a sleeve which is circumscribed at each end by a ring of brazing alloy is inserted within a tube in need of repair and slidably positioned across the section of the tube where the walls have been damaged due to corrosion or denting. The ends of the tube are then usually hydraulically expanded so that they snugly engage the inner walls of the tube being repaired. To complete the joint, a heater assembly which may be formed from an electrical resistance wire coiled around a mandrel is slid up into the sleeve and actuated so that radiant heat melts the rings of brazing alloy disposed between the outer wall of the sleeve and the inner wall of the tube, thereby forming water-tight braze joints between the ends of the sleeve and the tube. Such prior art sleeving operations are frequently performed in the longitudinal sections of the heat exchange tubes which extend through the tubesheet of the nuclear steam generator due to the tendency of these sections of the tubes to corrode, dent and crack.

One of the problems associated with the implementation of such brazing processes is the application of the proper amount of radiant heat to the brazing material. If the electrical resistance coil is actuated for an insufficient amount of time, the brazing material might not uniformly melt and flow in the annular space between the reinforcing sleeve and the tube being repaired, thereby resulting in a poor-quality braze joint which would not create the desired water-tight seal between the sleeve and the tube. On the other hand, if an excessive amount of heat is applied to this brazing material, the brazing material may be liquified to the point where it is too thinly spread between the outer walls of the sleeve and the inner walls of the tube, which again could result in a poor-quality braze joint.

One attempted solution to this problem involves the actuation of the electrical resistance coil for an "average" amount of time at a given power level, wherein the "average" is an empirically determined quantity based upon a statistical analysis of a series of experimental brazings. However, because of wide variations in the heat-sink properties in any given number of sleeve/tube combinations, the use of an empirically derived "average" amount of heating time has not resulted in a completely satisfactory solution to the problem. It is believed that a principal cause of these wide heat-sink variations is the amount of dark-colored oxides on the outside walls of the tubes being brazed. The presence of a layer of such dark-colored oxides on the outside walls of the tubes can greatly increase the radiant heat losses out of the sleeve/tube combination due to the phenomenon of black-body radiation. Other causes of heat-sink variations may include the amount and type of corrosion between the tube and the tubesheet (some oxides are fairly good heat conductors), as well as the amount of water surrounding the tube being brazed. These variations make it difficult to consistently apply the proper amount of radiant heat to the inside of the sleeve/tube combination so that the heater assembly melts the ring of brazing alloy to the desired extent to successfully braze the outer walls of the reinforcing sleeve to the inner walls of the surrounding heat exchange tube.

Clearly, there is a need for some means for correctly and reliably determining the amount of time that the heating element of a radiant brazing heater should be actuated in order to consummate a strong, water-tight braze joint in the space between the outer walls of the reinforcing sleeve and the inner walls of the surrounding heat exchange tube. Ideally, such means should be capable of precisely determining the proper length of time that the radiant brazing heater should be actuated, regardless of the particular heat-sink properties of the sleeve/tube combination being brazed. Finally, such means should be conveniently usable in conjunction with radiant braze heaters, rugged in construction, and capable of withstanding the brazing heat generated by the coil.

SUMMARY OF THE INVENTION

In its broadest sense, the invention is both a method and an apparatus for detecting a melt condition in a brazing material located on the outside of a conduit. The invention finds particular application in the repair of the heat exchange tubes of nuclear steam generators, wherein reinforcing sleeves circumscribed by rings of brazing alloy are brazed within heat exchange tubes which have been damaged by corrosion or denting.

In the method of the invention, a radiant heater assembly is inserted within a reinforcing sleeve which in turn is concentrically disposed within the tube to be repaired. The electrical resistance element is positioned adjacent the ring of brazing material circumscribing the sleeve. The electrical resistance element, which is preferably a coil, is first electrically connected to a heater power source in order to generate a brazing heat. The resistance element is then disconnected from the heater power source, and finally connected to a source of relatively low power alternating current in order to induce eddy currents in the brazing material. Changes in the impedance of the resistance element are monitored while the low power alternating current flows through the element. These process steps are repeated until a substantial change in the impedance of the element is noted. Such a substantial change in the impedance provides a positive indication that the ring of brazing alloy circumscribing the sleeve has melted to form a braze joint between the outer surface of the sleeve and the inner surface of the tube.

The electrical resistance element may include a heating coil formed from first and second coils wound clockwise and counterclockwise, respectively, around the longitudinal axis of the heater assembly, in order to form a differential eddy current coil. Additionally, the method of the invention may include the step of adjusting the differential output current of the differential eddy current coil formed by the first and second coils to zero before changes in the impedance are monitored in order to maximize the accuracy of the method in providing a positive indication that a braze melt condition has occurred. The method may further include the steps of monitoring both the rate of change of the substantial increase in the impedance of the coils, as well as the polarity of the resulting differential current generated by the coils in order that both the rate of the melt and its direction along the longitudinal axis of the heater assembly may be determined.

The apparatus of the invention may comprise the aforementioned heater coil formed from first and second oppositely wound coils for both applying a brazing heat on the ring of brazing material surrounding the sleeve, and for inducing eddy currents in this material which may be used to infer the time, rate, and direction of the braze melt. The apparatus may further include a control circuit for automatically alternately connecting the first and second coils first to the heater power source, and then to the aforementioned source of relatively low power alternating current (which may be an eddy current circuit) until changes in the differential current generated by these coils indicates that the brazing material has melted. This control circuit may also include a timing circuit for controlling the period of time that these coils are connected to the heater power source and to the eddy current circuit, as well as a means (such as a power source relay or a zero-voltage detector) for disconnecting the first and second coils from the power source when the instantaneous voltage from the power source is low in order to avoid arcing. Finally, the control circuit may include a null command circuit electrically connected to the nulling circuit of the eddy current circuit for actuating the nulling circuit every time the first and second coils are electrically connected to the eddy current circuit. The provision of such a null command circuit increases the accuracy of the invention by allowing the monitoring device associated with the eddy current circuit to consider only changes in the impedance of the coils which occurred within the time period that these coils are inducing eddy currents within the ring of brazing material circumscribing the sleeve.

BRIEF DESCRIPTION OF THE SEVERAL FIGURES

FIG. 2 is a cross-sectional side view of the trailing shoulder of the heating assembly of the invention, rotated 90° from the position in which it is shown in FIG. 1A;

FIG. 3A is a cross-sectional view of the trailing shoulder of the heating assembly taken along line A—A in FIG. 2;

FIG. 3B is another cross-sectional view of the trailing shoulder of the heating assembly taken along line B—B of FIG. 2;

FIG. 3C is another cross-sectional view of the trailing shoulder of the heating assembly taken along line C—C of FIG. 1A;

FIG. 4 is a schematic diagram of the heater assembly, control circuit, eddy current circuitry, and power source of the invention;

FIG. 5 is an enlarged view of the circled portion of FIG. 4;

Figure 6A:
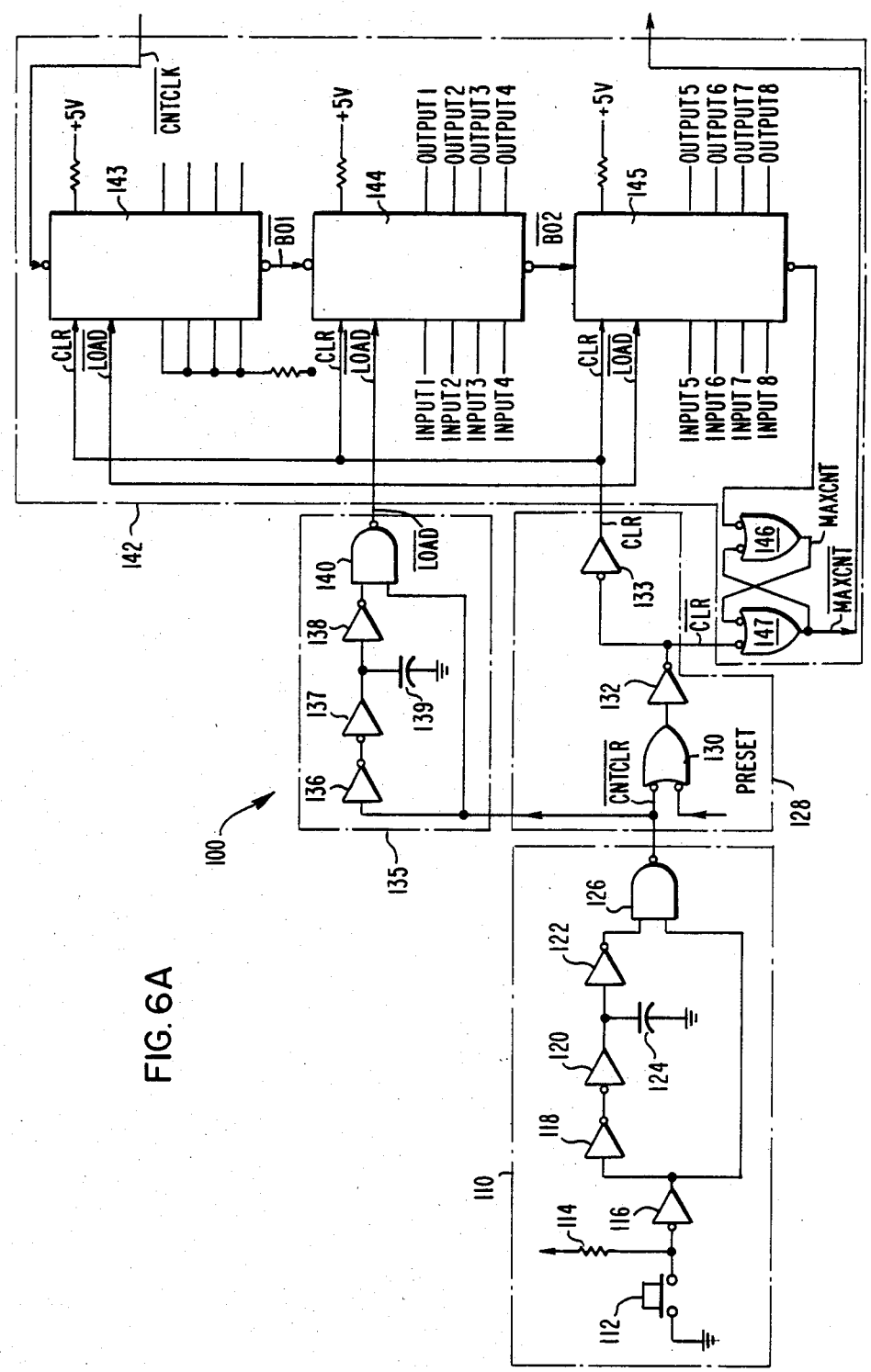
Figure 6B:
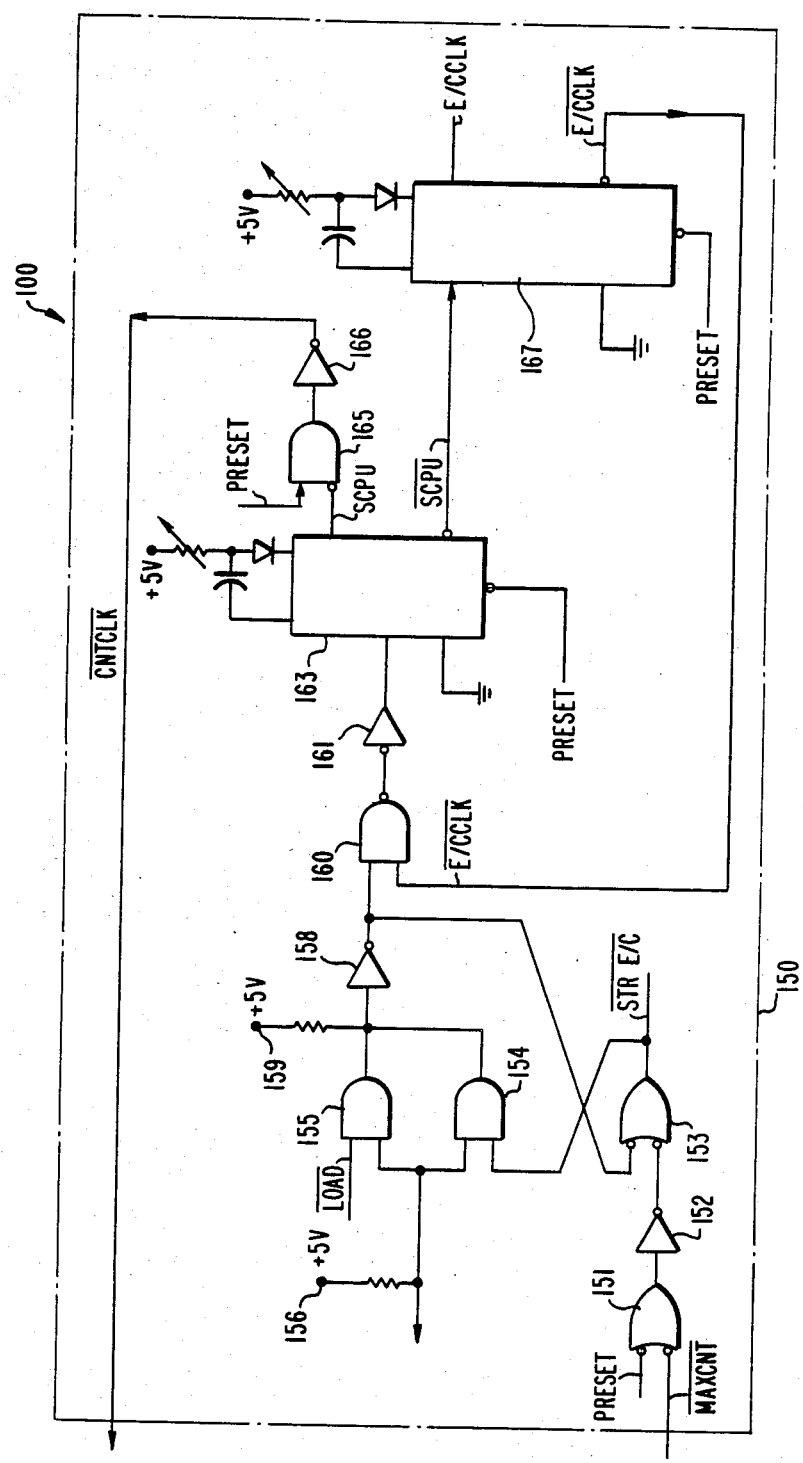
Figure 6D:
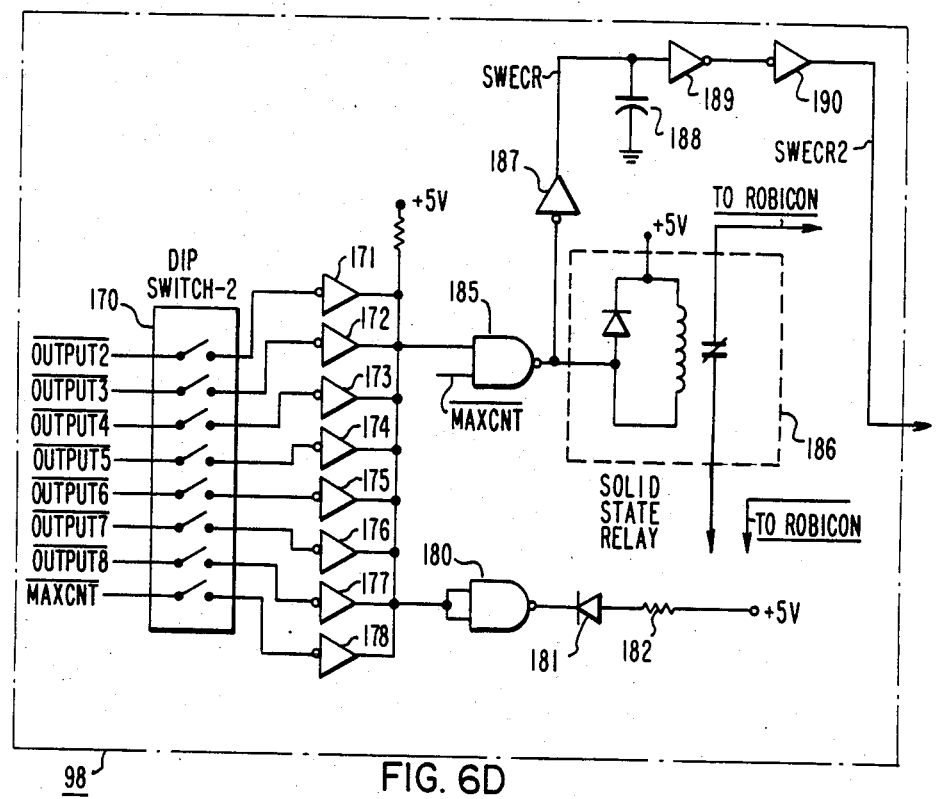
Figure 6C:
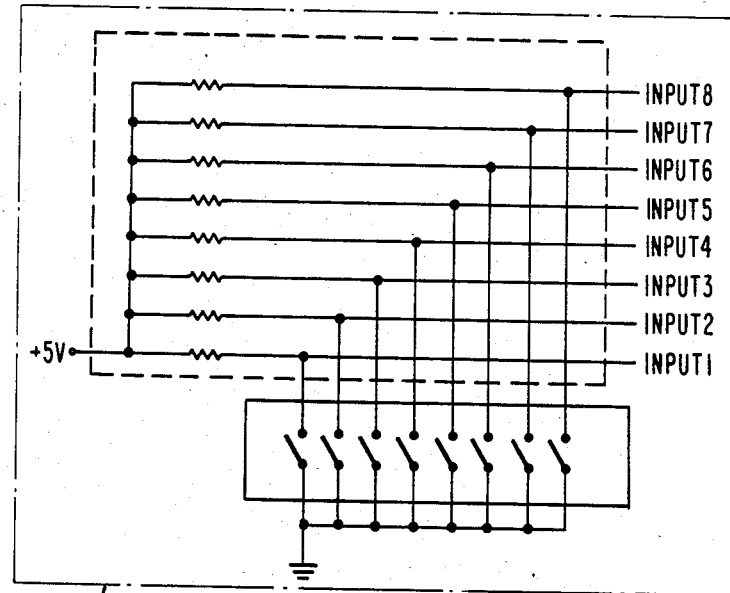
Figure 6E:
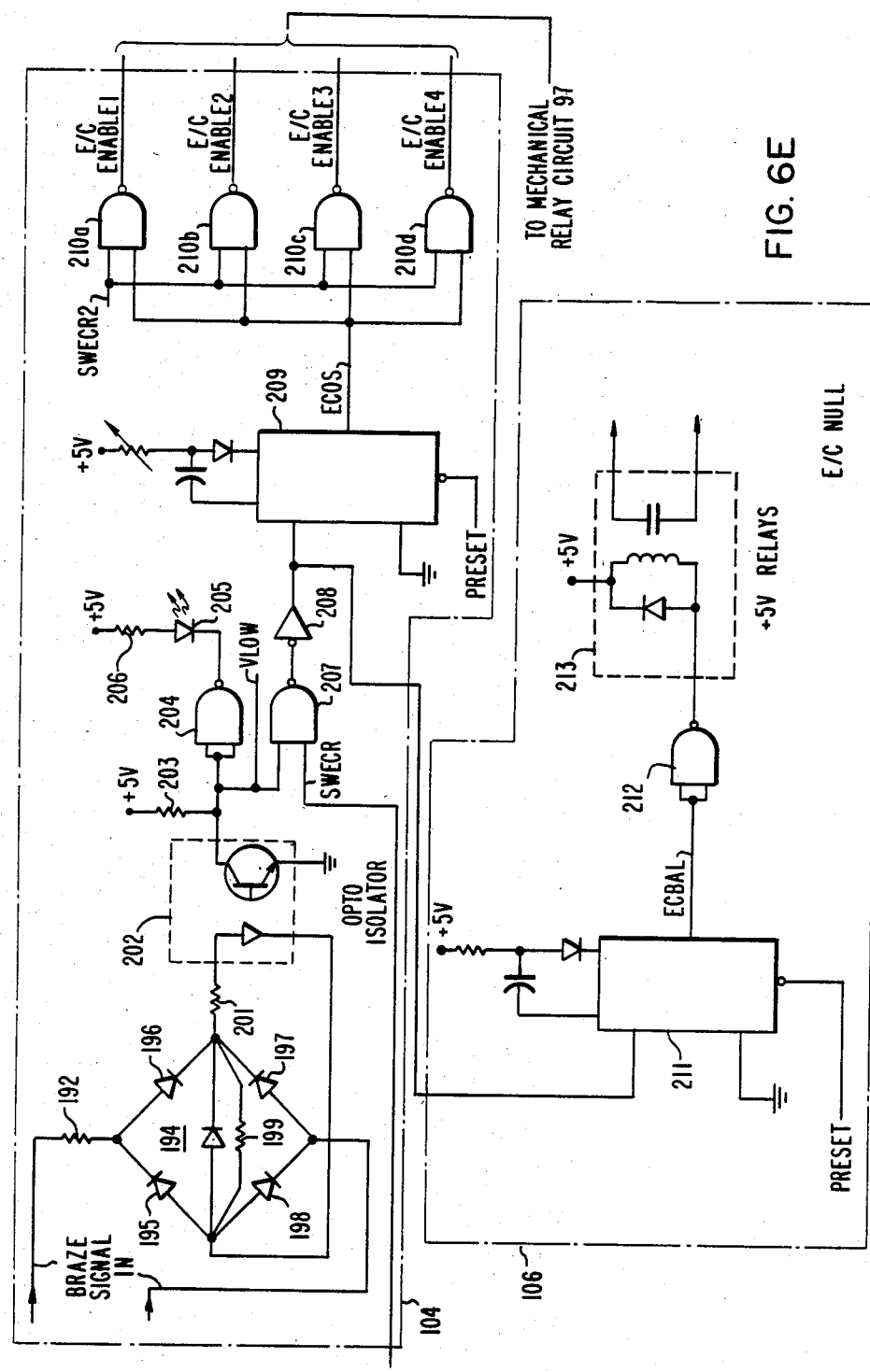
Figure 6F:
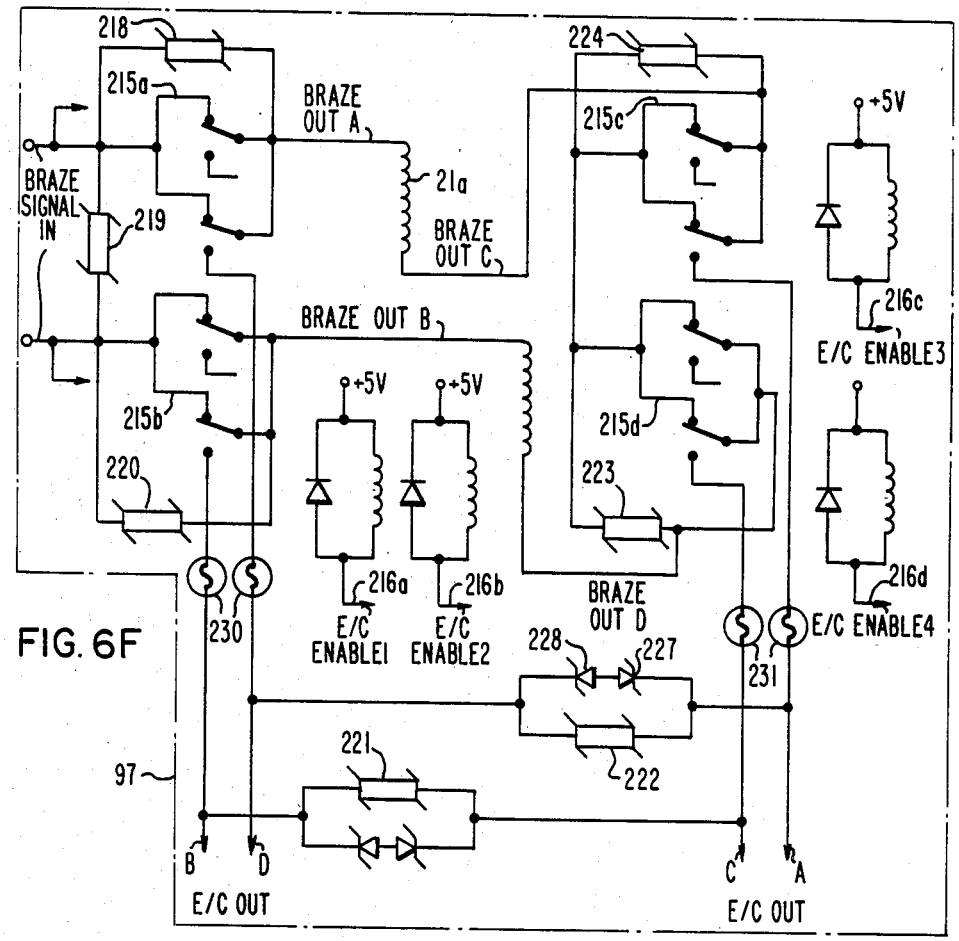
Figure 6G:
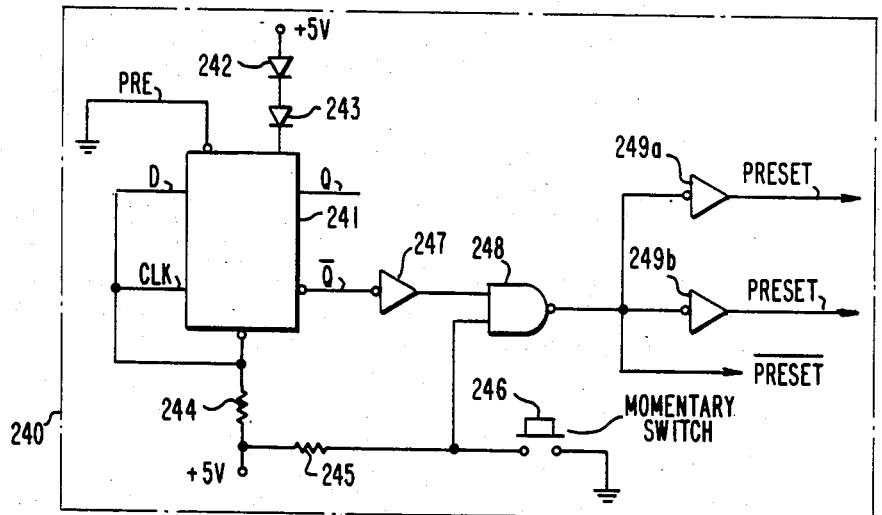
Figure 7:
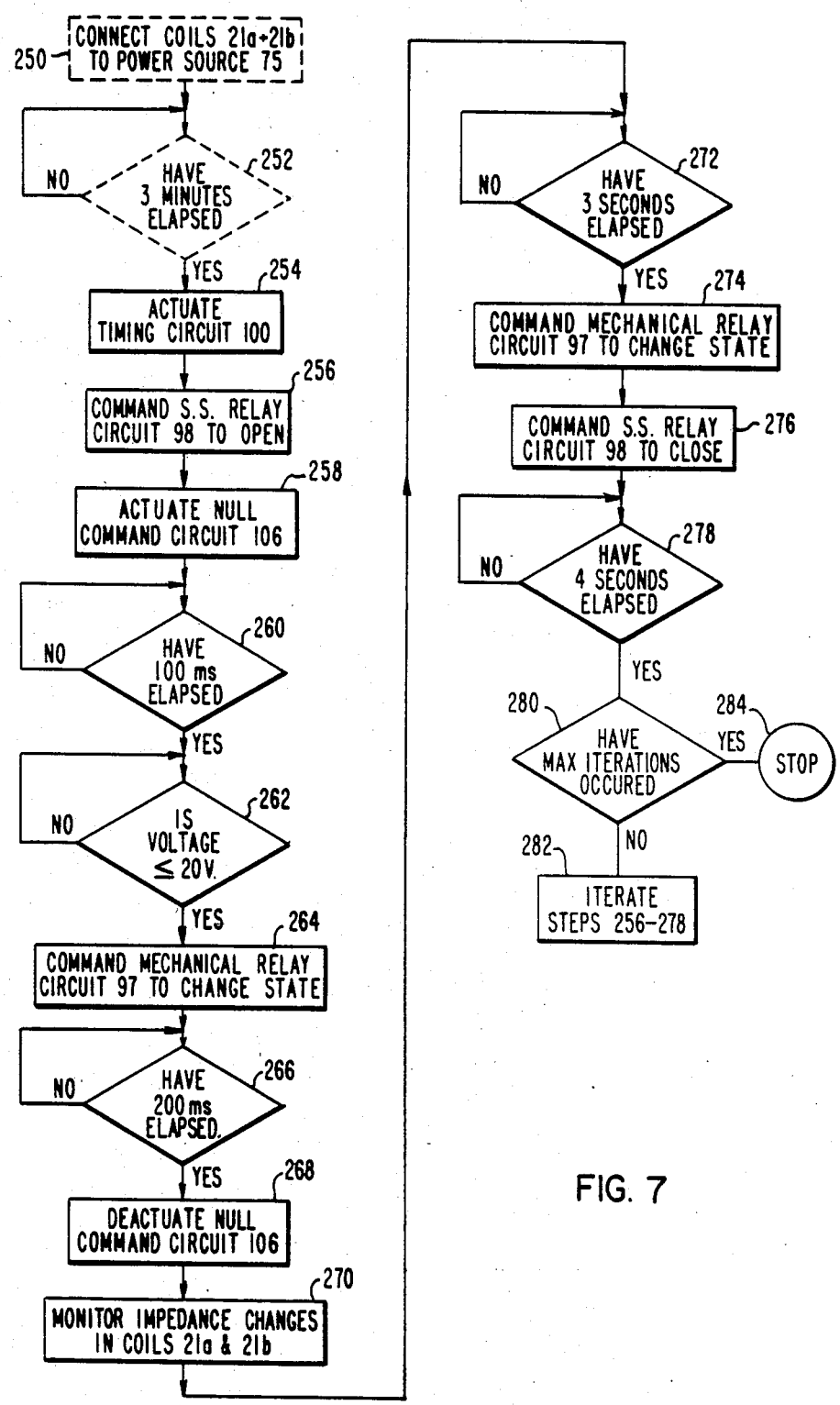

FIG. 6A through 6G form a schematic diagram of the control circuit of the invention, and FIG. 7 is a generalized flow chart of the preferred embodiment of the method of the invention, as implemented by the control circuit.

DETAILED DESCRIPTION OF THE PREFERRED EMBODIMENT

Figures 1A, 1B:
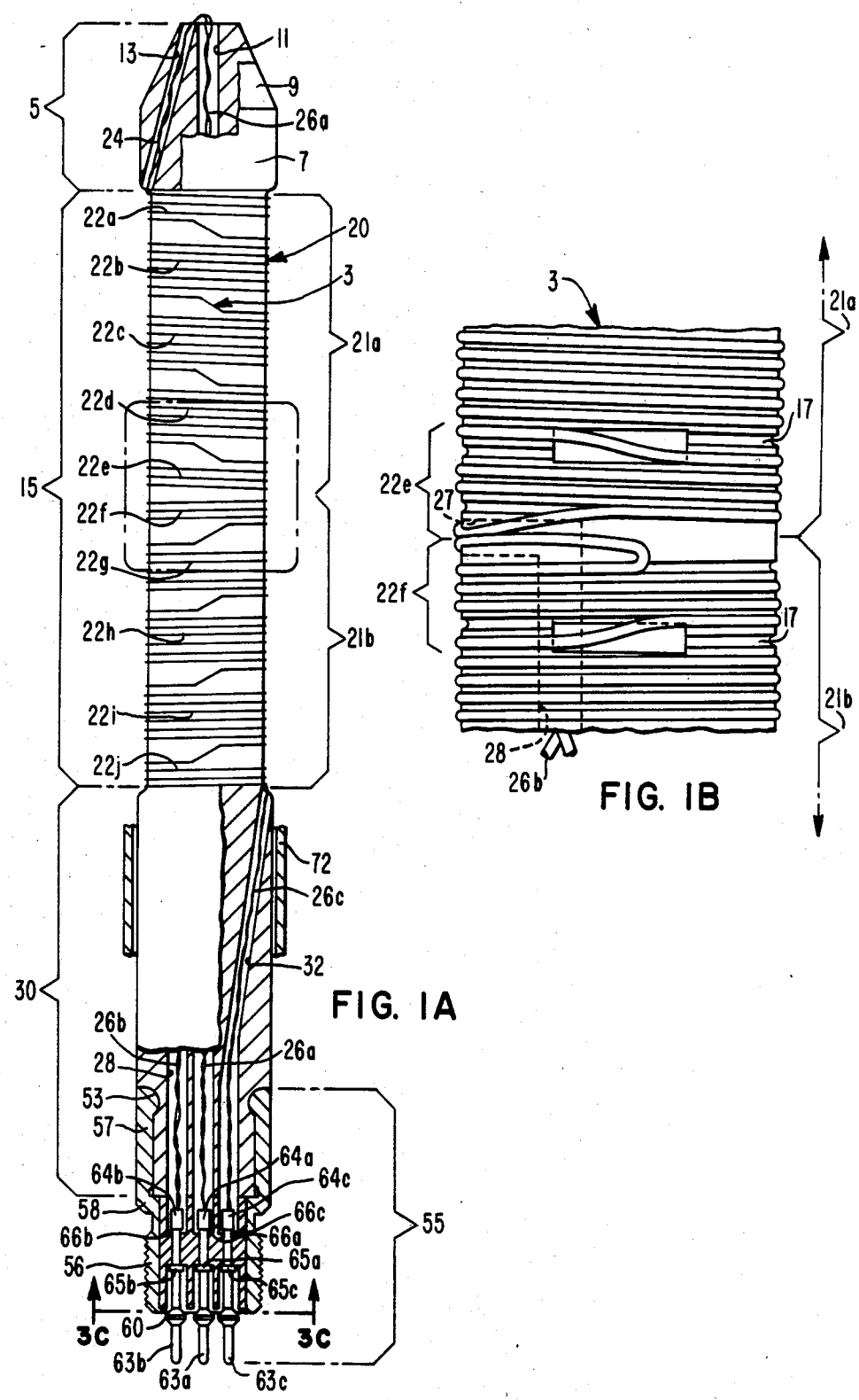
FIG. 1A is a partial cross-sectional side view of the heater assembly of the invention.
FIG. 1B is an enlarged view of the circled area of FIG. 1A.

General Description of the Structure and Operation of the Preferred Embodiment With reference to FIGS. 1A, 1B and 4, wherein like numerals designate like components throughout all of the several figures, the apparatus of the invention generally comprises a radiant heater assembly 1 having a pair of heating and eddy current coils 21a, 21b (would clockwise and counterclockwise, respectively around mandrel 3) in combination with a control circuit 95 which alternately switches the leads of the coils 21a, 21b from the heater power source 75 to the eddy current circuitry 80 and back again in accordance with a specific time sequence. The coils 21a, 21b are formed from a platinum-rhodium wire which will generate a radiant, brazing heat when leads 26a, 26c are connected to the heater power source 75. These coils 21a, 21b will also induce eddy currents in the metallic ring of brazing material 74 which circumscribes both of the enlarged ends of the reinforcing sleeve 72 when the leads 26a, 26b and 26c are connected to the eddy current generator and detector 82 of the eddy current circuitry 80. The control circuit 95 includes a mechanical relay circuit 97 which acts like a double-pole, double-throw switch in alternately connecting the coils 21a, 21b of the heater assembly 1 to either the heater power source 75 or the eddy current generator and detector 82 (but not both simultaneously). Control circuit 95 also includes a timing circuit 100 which controls the amount of time the mechanical relay circuit 97 connects the coils 21a, 21b to either the heater power source 75, or to the eddy current generator and detector 82.

A general understanding of the operation and method of the invention may be obtained by referring to FIGS. 4 and 7. In the first step of the method of the invention, the coils 21a, 21b are electrically connected to the heater power source 75 through the mechanical relay circuit 97 for a period of about three minutes, which is the minimum amount of time during which any melting of the ring of brazing alloy 74 could occur. This step is preferably manually executed, as indicated by the dotted lines which define boxes 250 and 252 in FIG. 7. After three minutes, the timing circuit 100 is actuated. The balance of the steps of the process are automatically implemented by the control circuit 95, as indicated by the solid lines defining boxes 254 through 284 in FIG. 7. In the first of these automatic steps, the timing circuit 100 proceeds to alternately disconnect the coils 21a, 21b from the heater power source 75, and to connect the three input leads 26a, 26b and 26c of these coils to the eddy current generator and detector 82 of the eddy current circuit 80. The eddy current generator and detector 82 transmits relatively low current, high-frequency alternating current through the coils 21a, 21b which in turns induces eddy currents in the ring of brazing material 74 circumscribing the ends of the reinforcing sleeve 72. The outputs of the coils 21a, 21b are connected across an adjustable, impedance-type bridge circuit included within the eddy current generator and detector 82 (but not specifically shown in this Figure). As the ring of brazing material 74 begins to melt in the annular space between the sleeve 72 and the tube 70, the amount of impedance experienced by these eddy currents changes, since air is a much poorer conductor of electricity than the flowing metal which forms the brazing material. These changes in impedance will cause an unbalanced condition to occur in the impedance bridge included within the eddy current generator and detector circuit 82. As will be described in more detail hereinafter, the magnitude, slope and polarity of the resulting current flowing through the unbalanced impedance bridge may be used to determine the time and rate at which the ring of brazing material 74 melts, as well as its direction of flow along the longitudinal axis of the sleeve/tube combination. Of course, such a melt condition rarely (if ever) occurs the first time the impedances of the coils 21a, 21b are monitored, after the initial, three-minute connection between the coils 21a, 21b and the heater power source 75. Accordingly, the timing circuit 100 is adjusted to flip the double-pole, double-throw switch formed by the mechanical relay circuit 97 back and forth between the heater power source 75 and the eddy current generator and detector 82 a maximum of sixteen times. The time periods are chosen to insure that a melt condition will occur in the ring of brazing material 74, and that this melt condition will be detected when the coils 21a and 21b are connected to the eddy current generator and detector 82.

Specific Description of the Structure and Operation of the Preferred Embodiment

Turning now to FIGS. 1A and 1B and a more specific description of the heater assembly 1, the enlarged leading shoulder 5 of the heater mandrel 3 has a cylindrical portion 7 which terminates in a frustro-conical end 9. Leading shoulder 5 further includes both a centrally disposed bore 11 and an off-center bore 13. Bore 11 accommodates braided lead wire 26a of the coil assembly 20, while bore 13 houses wire 24 of the coil assembly. Centrally disposed bore 11 does not terminate at the proximal end of the leading shoulder 5, but extends completely through the generally cylindrical body of the mandrel 3, and all the way through the trailing shoulder 30. As used herein, the words "proximal" and "distal" are used from the perspective of the operator, who manipulates the heater assembly by means of a nylon push-rod (not shown) connected to the lead-wire end of the mandrel 3. The generally cylindrical central portion 15 of the mandrel 3 is disposed between the previously described leading and trailing shoulders 15 and 30. As is indicated in FIG. 1A, the centrally disposed portion 15 of the mandrel 2 accommodates the windings of the heater coil assembly 20. The provision of the enlarged shoulders 5 and 30 on either side of the smaller-diameter central portion 15 of the mandrel 3 serves three important functions. First, since these shoulders 5 and 30 are formed from a heat-insulating substance, the inner edges of these shoulders define fairly sharp limits in the longitudinal shape of the heating zone generated by the coil assembly 20. This feature renders the heater assembly 1 particularly useful in carrying out the two-step brazing process described and claimed in previously mentioned patent application Ser. No. 634,336, since proper implementation of this process requires that the brazing heat be accurately applied along specific longitudinal sections of the sleeve 72. Secondly, these shoulders 5 and 30 help concentrically space the windings of the coil assembly 20 from the inside walls of the sleeve 72 or other conduit being brazed so that the coil assembly applies uniform heat at all points along its diameter. Thirdly, these shoulders 5 and 30 prevent the windings of the coil 20 from inadvertently rubbing against the inner walls of the sleeve when the heater assembly is slid up and down the tube.

As may best be seen in FIG. 1B, the coil assembly 20 is formed from two separate coils 21a, 21b, wound clockwise and counterclockwise, respectively, around the cylindrical central portion 15 of the heater mandrel 3. In order that each of the coils 21a, 21b may generate a magnetic field of the same shape and intensity (albeit at different polarities) when the coils are connected to the eddy current circuitry 89, each of the coils 21a, 21b is preferably formed from the same number of windings (which amounts to approximately forty windings each). The windings of each of the coils 21a, 21b are seated in uniformly spaced grooves 17 which are helically disposed around the outside surface of the central portion 15 of the heater mandrel 3. Each of these grooves 17 receives one of the windings of the coils 21a, 21b as shown. These grooves 17 assist the enlarged shoulders 5 and 30 in preventing the windings of the coils 21a, 21b from becoming bunched up or otherwise longitudinally displaced as a result of any incidental friction that the windings experience as the heater assembly 1 is slid through a sleeve/tube combination. Such bunching up of the coil windings could interfere with the symmetry of the magnetic fields produced by the coils 21a, 21b when they are connected to the eddy current circuitry. Additionally, this bunching up could create short circuits in the coil assembly 20, which in turn could form undesirable "hot spots" in the central portion 15 of the mandrel 3. Such "hot spots" could ultimately weaken the material forming the mandrel 3, and create non-uniformities in the pattern of heat flux generated by the coil assembly 20. As a further precaution against formation of such "hot spots", each of the coils 21a and 21b forming the coil assembly 20 is preferably subdivided into a series of serially-spaced coil sections 22a–22e and 22f–22j, respectively. In both coils 21a and 21b, each of these coil sections is separated from its neighbors by a small, heat-dissipating gap. Such spacing also has the advantage of extending the length of the nearly isothermal heating zone located approximately near the center of the heater mandrel 3.

At its distal end, the coil 21a continues in the form of the aforementioned wire 24 which in turn becomes the previously mentioned braided lead wire 26a. At its proximal end, the last coil section 22e of the coil 21a continues in the form of a wire which is twisted together with a wire from the first coil section 22f of coil 21b to form a second braided lead wire 26b which is common to both the coils 21a and 21b. As may best be seen in FIG. 1B, braided lead wire 26b is housed within a lateral bore 27, which in turn connects with another bore 28 which is parallel to the longitudinal axis of the heater mandrel 3. Like bore 11, bore 28 extends completely through the body of the mandrel 3. Finally, at its proximal end, the last coil section 22j of the coil 21b becomes braided lead wire 26c which is housed in a bore 32 extending completely through the trailing shoulder 30 of the mandrel 3. The use of braided lead wires 26a, 26b and 26c (each of which is formed from two wires twisted about 12 or 13 turns per inch) is preferably over single-filament type lead wires due to their superior strength and thermal characteristics. More specifically, the braiding effectively reduces the resistance heating of the lead by increasing the conductive cross-section of the wire within the central bore 11 of the heater mandrel 3. This in turn prevents the lead from melting at high power levels. As will be described in more detail hereinafter, the braided lead wires 26a, 26b and 26c each ultimately extend out of the proximal end of the trailing shoulder 30, where they are connected to the pins 63a, 63b and 63c of a connector assembly 55. Each of the coils 21a and 21b forming the coil assembly 20 is formed from platinum-rhodium wire approximately 0.020 in. in diameter which includes from 70% to 90% platinum and from 10% to 30% rhodium, and which is capable of being operated at a power level of about 1,000 watts. While an alloy formed anywhere within these ranges will work, applicants have found that an alloy formed of 70% platinum and 30% rhodium seems to work best. The coil assembly 20 itself is preferably about 0.550 in. in diameter, which leaves about 0.115 in. of radial clearance between the coil 20 and the inside wall of a typical reinforcing sleeve. The advantages associated with the use of braided lead wires, spaced coil sections, and platinum-rhodium alloy wire in the heating coil 20 are specifically set forth in U.S. patent applications Ser. No. 571,214 and 571,215, filed by John M. Driggers and John M. Driggers et al, respectively, on Jan. 16, 1984 and assigned to Westinghouse Electric Corporation. Both specifications are hereby expressly incorporated herein by reference.

With specific reference now to FIG. 1A, the third major section of the mandrel 3 of the heater assembly 1 is the previously mentioned enlarged, generally cylindrical trailing shoulder 30. Shoulder 30 includes the three previously mentioned bores 11, 28 and 32 for housing lead wires 26a, 26b and 26c, respectively. After entering the trailing shoulder 30 at a shallow angle, bore 32 straightens into parallel alignment with the two other bores 11 and 28. In the preferred embodiment, the bores 11, 28 and 32 are equidistantly spaced from one another near the proximal end of the trailing shoulder 30 in order to provide a sufficient amount of electrically insulating mandrel material between the three braided lead wires 26a, 26b and 26c so that short-circuiting does not inadvertently occur between these lead wires.

With reference now to FIGS. 2, 3A and 3B, the trailing shoulder 30 of the mandrel 3 also includes a longitudinally disposed gas bore 45 for conducting an air-purging flow of inert gas (preferably helium) around the body of the heater mandrel 3 surrounded by the heating coil assembly 20 during the heating process. Such a flow of inert gas prevents the heat-insulating refractory material which forms the central portion 15 of the heater mandrel 3 from reacting with ambient atmospheric oxygen during the brazing process, which in turn lengthens its useful lifespan. Moreover, the applicant has found that such a gas flow will enhance the transfer of heat from the heater coil 20 to the inner walls of the sleeve being brazed at low gas flow rates, but can also be advantageously used to cool off the heater assembly 1 at higher gas flow rates.

With specific reference now to FIGS. 2 and 3A, this longitudinally disposed gas bore 45 terminates at its distal end into the midpoint of a chordally oriented bore 47. Each of the ends of the bore 47 in turn terminates in short flutes 49a and 49b which longitudinally extend up the outer surface of the trailing shoulder 30 to the junction between the top of the shoulder 30 and the bottom of the heating coil 20. These flutes 49a and 49b coact with the inner surfaces of the reinforcing sleeve to divert the flow of inert gas from a lateral direction out of the ends of chordally oriented bore 47 to a generally longitudinal direction, in order that the inert gas might effectively purge the ambient atmospheric gas surrounding the coil-holding central portion 15 of the mandrel 3. The trailing shoulder 30 of the mandrel 3 terminates in a threaded end portion 51 which is circumscribed by an annular shoulder 53 at its distal end for a purpose which will become evident presently. While the leading shoulder 5, the central portion 15, and the trailing shoulder 30 of the mandrel 3 are all integrally formed from a generally cylindrical piece of 99.9% pure boron nitride of a diffusion bonded grade, other refractory materials (such as zirconia and alumina) may also be used. However, the use of boron nitride is preferred due to the fact it is generally easier to machine and is believed to have better thermal shock-resistant characteristics. Moreover, the coefficient of thermal expansion of boron nitride is compatible with the coefficient of thermal expansion of a heating coil formed from a platinum-rhodium alloy.

With reference again to FIG. 1A, the threaded end portion 51 of the trailing shoulder 30 of the mandrel 3 is threadedly engaged to a connector assembly 55. The overall function of the connector assembly 55 is to form a solid mechanical and electrical connection between the braided lead wires 26a, 26b and 26c and electrical connector pins 63a, 63b and 63c. In the preferred embodiment, these terminal pins 63a, 63b and 63c are plugged into the pin receptacle of a support mandrel of the type described and claimed in U.S. patent application Ser. No. 720,107, filed Apr. 4, 1985, entitled "Improved Braze Heater Assembly" by John M. Driggers and William E. Pirl and assigned to Westinghouse Electric Corporation, the entire text of which is hereby expressly incorporated herein by reference. Connector assembly 55 generally includes an externally threaded housing member 56 having an internally threaded, cylindrical skirt 57 extending therefrom. The distal end of housing member 56 and the proximal end of the cylindrical skirt 57 are mutually connected through annular shoulder 58. Like skirt 57, housing member 56 is essentially hollow, and includes a cylindrically shaped space 59 for housing a pair of semi-cylindrical insulating pieces 61a and 61b preferably formed from boron nitride. As is indicted in FIG. 1A, the proximal end of the housing member 56 terminates in an annular capturing flange 60 which secures the semi-cylindrical pieces 61a, 61b within the member 56. Housing member 56, cylindrical skirt 57 and annular shoulder 58 are all integrally formed from No. 300 stainless steel due to its corrosion resistance and favorable machining characteristics.

As may best be seen with reference to FIGS. 1A and 3C, each of the aforementioned semi-cylindrical insulating pieces 61a and 61b includes three parallel, semi-circular grooves 62a, 62.5a, 62.7a and 62b, 62.5b, 62.7b on its flat face for receiving the crimp contacts 64a, 64b and 64c of the terminal pins 63a, 63b and 63c, respectively. These grooves 62a, 62b, 62.5a, 62.5b, and 62.7a, 62.7b are mutually registrable when the flat faces of the two semi-cylindrical insulating pieces 61a and 61b are abutted against one another to form a single, cylindrically shaped insulator member which may be captured between the proximal end of the mandrel 3 and the capturing flange 60 of the housing member 56. When the two semi-cylindrical insulating pieces 61a, 61b are so positioned, the three pairs of semi-circular grooves 62a, 62b, 62.5a, 62.5b, and 62.7a, 62.7b form the equivalent of three parallel bores which extend along the longitudinal axis of the mandrel 3. As is best seen in FIG. 1A, each of these bores is recessed at its proximal and distal ends in order to complement the shape of the pins 63a, 63b and 63c, each of which includes a lower stop shoulder 65a, 65b, 65c and an upper stop shoulder 66a, 66b and 66c. These lower and upper stop shoulders serve to lock each of the pins 63a, 63b and 63c into the single, cylindrical insulator member formed when the flat sides of the two semi-cylindrical insulating pieces 61a, 61b are abutted together and captured within the cylindrical space inside the housing member 56. An electrical and mechanical connection is formed between each of the pins 63a, 63b and 63c and its corresponding braided lead wire 26a, 26b and 26c by inserting the lead wire within its respective crimp contact 64a, 64b and 64c and squeezing the center of the crimp contacts with an appropriate crimping tool. In the preferred embodiment, each of the pins 63a, 63b and 63c and their associated crimp contacts 64a, 64b and 64c is formed from gold-plated copper. After the crimp connection between each of the braided lead wires 26a, 26b and 26c and its respective pin 63a, 63b and 63c is made, the housing member 56 is preferably screwed onto the threaded end portion 51 of the trailing shoulder 30 in the position shown in FIG. 1A until the distal edge of the cylindrical skirt 57 abuts the annular shoulder 53 in the trailing mandrel shoulder 30, and the annular shoulder 58 firmly engages the proximal end of the shoulder 30. Such threaded engagement between the housing member 56 and the threaded end portion 51 of the trailing shoulder d30 of the mandrel 3 achieves two purposes. First, such positioning firmly secures the cylindrically shaped insulator formed from the two semi-cylindrical insulating pieces 61a, 61b between the capturing flange 50 and the proximal end of the mndrel 3. Secondly, such engagement serves to equilibrate any shear forces which the housing member 56 and cylindrical skirt 57 might apply onto the end of the trailing shoulder 30 of the mandrel 3 when the heater assembly 1 is pushed through various sections of a sleeve/tube combination. This force-equilibrating function is important, as the boron nitride from which the mandrel 3 is preferably formed tends to be brittle.

With reference now to FIG. 4, the coils 21a, 21b of the heater assembly 1 are connected to both a heater power source 75 and an eddy current circuit 80 through control circuit 95, as indicated. The heater power source 75 is in turn connected to a 20-amp, 110-volt A.C. source 77. The output of the heater power source 75 is controlled by the solid state relay circuit 98, which is serially connected between the output of the source 75 and the input of mechanical relay circuit 97. In the preferred embodiment, the solid state relay 98 should be able both to bring the heater power source 75 up to full power in a fast soft-start mode in less than 250 milliseconds, and should turn off the power source 75 within 100 milliseconds. If the start-up or turn-off times are longer, the time period available for the eddy current generator and detector 82 to monitor changes in the impedance of the coils 21a, 21b could be attenuated to a point where a melt condition might occur between monitoring periods. It should be noted that the heater power source 75 forms no part of the invention per se, and may be any one of a number of commercially available power sources.

the eddy current circuitry 80 consists of the previously described eddy current generator and detector 82, which is connected to the mechanical relay circuit 97 through a pair of pre-amp circuits 85a, 85b as indicated. The provision of these pre-amp circuits 85a, 85b insures that the relatively low current, high frequency signal generated by the eddy current generator and detector 82 will reach the mechanical relay circuit 97 of the control circuit 95 with a minimum of distortion due to noise and the impedance of the cable which carries the signal. As previously mentioned, the eddy current generator and detector 82 includes an adjutable, impedance-type bridge for analyzing impedance changes which occur in the coils 21a, 21b as the relatively low current, high-frequency alternating current passes therethrough. Generally speaking, the output of each coil 21a, 21b is connected to opposing ends of this impedance-type bridge. A differential current will flow through the bridge whenever the impedances in the coils 21a, 21b are unequal. While the invention could conceivably be operated by means of a single coil instead of the differential coil structure described herein, the use of a differential coil structure is preferred because it increases the accuracy of the apparatus of the invention by approximately two orders of magnitude.

In order to sharply resolve impedance changes which occur during the monitoring periods (i.e., the time that the eddy current circuit 80 is electrically connected to the coils 21a, 21b) the eddy current generator and detector 82 further includes a nulling circuit (not shown). The nulling circuit adjusts the adjustable impedances on the legs of the impedance bridge in order to initially bring the bridge into perfect balance at the start of every monitoring period. The use of the nulling circuit in this manner eliminates spurious impedance changes which are not related to the braze melt and which could otherwise distort the test results.

Both an oscilloscope 87 and a strip recorder 90 are electrically connected to the output of the eddy current generator and detector 82, as indicated. Basically, both the oscilloscope 87 and the strip recorder 90 generate a visual presentation of the magnitude, slope and polarity of any differential current which flows through the impedance bridge of the eddy current generator and detector 82 as a result of a significant change in the impedance of one of the coils 21a, 21b during the monitoring period. A significant change in the magnitude of this current indicates that the ring of brazing alloy 73 has been transformed from a plastic condition to a liquid condition, and is flowing within the annular space between the sleeve 73 and the tube 70. The slopd of this resulting current indicates the rate at which the brazing material is flowing into this annular space, and the polarity of this current indicates at which direction along the longitudinal axis of the heater assembly 1 this melt is ocurring. The slope of the resulting impedance change over time may best be seen by the strip recorder 90, and the entire curve may be recorded by tape recorder 92.

The manner in which the invention detects the direction of flow may best be understood with reference to FIG. 5. As mentioned previously, coil 21a is wound clockwise around the mandrel 3, while coil 21b is wound counterclockwise this mandrel. At the beginning of each brazing operation, the junction between the two coils 21a and 21b is aligned approximately with the center of the ring of brazing alloy 74 circumscribing the reinforcing sleeve 73, in order that both of the coils 21a, 21b will generate significant eddy currents in the unmelted ring of brazing material (shown in phantom). These eddy currents are, of course, the result of electromagnetic coupling between the fluctuating magnetic fields surrounding the coils 21a, 21b and the electrically conductive metal forming the brazing material in the ring 74. The edddy currents induced by the two coils 21a, 21b are of similar strengths, but flow in opposite directions at any given instant, since the coils 21a, 21b are wound in different directions. When the ring 74 melts, the impedance in coil 21a will increase due to the fact that there will be more air space and less metal through which the eddy currents generated by coil 21 can circulate. However, the impedance in the bottom coil 21b will decrease, due to the fact that there is more metal and less air through which the currents generated by coil 21a can circulate. This impedance change between the two coils 21a, 21b will cause a differential current to flow through the impedance bridge in the circuit 82, which will have a distinctive polarity dependent upon whether the brazing material forming the ring 74 flows downwardly or upwardly, thereby causing the impedance of coil 21a to increase relative to coil 21b, or vice versa. This is useful information, because the brazing material does not always flow downwardly into the annular gap between the reinforcing sleeve 73 and the tube 70. Capillary action often overcomes the effects of gravity, and cause the liquified metal which forms the brazing material to flow upwardly in this annular space. The preferred eddy current circuit 80, which includes the previously described eddy current generator and detector 82, the pre-amp circuits 85a, 85b, the oscilloscope 87, strip recorder 90 and tape recorder 92 are all components of a commercially available eddy current circuit called a MIZ-12 frequency multiplexer, manufactured by Zetec, Inc., of Isaquah, Wash.

The control circuit 95 includes the previously mentioned mechanical relay circuit 97 which acts as a double-pole, double-throw switch. This circuit further includes the previously mentioned solid state relay circuit 98 for turning off the heater power source 75 in order to avoid arcing in the contacts of the mechanical relay circuit 97 when the coils 21a, 21b are disconnected from the heater power source 75. A timing circuit 100 is electrically connected to the mechanical relay circuit 97 and controls the time at which the mechanical relay circuit 97 switches the coils 21a, 21b from the heater power source 75 to the eddy current generator and detector 82. Control circuit 95 further includes a zero-voltage detector 104 which insures that the timing circuit 100 will disconnect the coils 21a, 21b from the heater power source 75 only when the instantaneous voltage of the current from the heater power source 75 is approximately zero (i.e., less than 20 volts). Finally, control circuit 95 includes a null command circuit 106 electrically connected to the nulling circuit (not shown) in the eddy current generator and detector 82. Upon the receipt of an appropriate command from the timing circuit 100, the null command circuit 106 signals the nulling circuit in the eddy current generator and detector 82 to adjust the impedance bridge in generator and detector 82 at the beginning of each impedance monitoring period so that no differential current flows through the bridge. This "nulling" of the bridge circuit eliminates spurious impedance readings which could eclipse, garble or distort impedance changes associated with a braze melt condition.

The structure of control circuit 95 is set forth with particularity in the schematic diagram illustrated in FIGS. 6A through 6G.

Timing Circuit 100

FIGS. 6A and 6B schematically illustrate the timing circuit 100. This circuit 100 generally includes an eddy current enable circuit 110 (which is manually actuated by means of switch button 112), a clearing circuit 128 and a loading circuit 135 for clearing and loading the counters in count-down circuit 142, and a clock circuit 150 for regulating the rate at which instructions are loaded into the count-down circuit 142 from digital switches 148 and 170 (illustrated in FIGS. 6C and 6D, respectively). In the preferred embodiment, each of the components illustrated in FIGS. 6A and 6B correspond to the following list of commercially available components:

| Eddy Current Enable Circuit 110 | |
|---|---|
| Resistor 114 | *1,000 ohms, 0.1 watt |
| Schmitt Trigger 116 | SN 7414-2 |
| Schmitt Trigger 118 | SN 7414-1 |
| Schmitt Trigger 120 | SN 7414-1 |
| Schmitt Trigger 122 | SN 7414-1 |
| Capacitor 124 | .001 microfarad |
| Positive NAND Gate 126 | SN 7400-1 |
| Clearing Circuit 128 | |
| Positive NAND Gate 130 | SN 7400-4 |
| Inverter 132 | SN 5404-4 |
| Inverter 133 | SN 5404-4 |
| Loading Circuit 135 | |
| Inverter 136 | SN 5404-4 |
| Inverter 137 | SN 5404-4 |
| Inverter 138 | SN 5404-4 |
| Capacitor 139 | 200 picofarad |
| Positive NAND Gate 140 | SN 7400-3 |
| Count-Down Circuit 142 | |
| Counter 143 | SN 74193-3 |
| Counter 144 | SN 74193-1 |
| Counter 145 | SN 74193-2 |
| Positive NAND Gate 146 | SN 7400-5 |
| Positive NAND Gate 147 | SN 7400-5 |
| Digital Switch 148 (see FIG. 5C) | DIP, 1,000 ohms |
| Clock Circuit | |
| Positive NAND Gate 151 | SN 7400-5 |
| Inverter 152 | SN 5404 |
| Positive NAND Gate 153 | SN 7400 |
| AND Gate 154 | SN 7409-1 |
| AND Gate 155 | SN 7409-1 |
| Resistor 156 | 1,000 ohms, .1 watt |
| Inverter 158 | SN 5404-4 |
| Resistor 159 | 1,000 ohms, .1 watt |
| Positive NAND Gate 160 | SN 7400-3 |
| Inverter 161 | SN 5404 |
| Retriggerable Monostable Multivibrator 163 | SN 74123 |
| AND Gate 165 | SN 7400-2 |
| Inverter 166 | SN 5405-4 |
| Retriggerable Monostable Multivibrator 163 | SN 74123 |

*Refers to either the model numbers of standard TTL components commercially available from Texas Instruments, Inc., of Dallas, Texas, or (in the case of a capacitor or resistor) to the specific capacitance or resistance of the component.

Solid-State Relay Circuit 98

With reference to FIG. 6D, the solid-state relay circuit 98 generally includes a digital switch 170 connected to an open collector buffer formed from a set of parallel inverters 171 through 178 in combination with a solid-state relay 186. As will be described in more detail hereinafter, the output of the digital switch 170 is transmitted to both the solid-state relay 186, as well as the mechanical relay circuit 97. The individual settings introduced into the digital switch 170 determine the amount of time that the eddy current coils 21a, 21b will be connected to the eddy current generator and detector 82 for each impedance monitoring period. In the preferred embodiment, the following commercially available parts are used for each of the components of solid-state relay 98:

| Digital Switch 170 | |
| --- | --- |
| Open Collector Buffer 171 | SN 7417-1 |
| Open Collector Buffer 172 | SN 7417-1 |
| Open Collector Buffer 173 | SN 7417-1 |
| Open Collector Buffer 174 | SN 7417-1 |
| Open Collector Buffer 175 | SN 7417-1 |
| Open Collector Buffer 176 | SN 7417-1 |
| Open Collector Buffer 177 | SN 7417-2 |
| Open Collector Buffer 178 | SN 7417-2 |
| NAND Gate 180 | SN 7430-1 |
| LED 181 | CM4-84B-2, 0.1 W |
| Resistor 182 | 330 ohms |
| NAND Gate 185 | SN 7438-1 |
| Solid-State Relay 186 | Model MRB 1805 from Clare Division of General Instrument Corporation, Chicago, Illinois |
| Inverter 187 | SN 7400-2 |
| Capacitor 188 | 200 picofarad |
| Schmitt Trigger 189 | SN 7414-3 |
| Schmitt Trigger 190 | SN 7414-3 |

Zero Voltage Detector 104

With reference now to FIG. 6E, zero voltage detector 104 is connected to the heater power source 75 (as indicated by the notation "Braze Signal In"), and includes a full-wave rectifier in the form of bridge circuit 194. The output of the full-wave rectifier 194 is coupled to an opto-isolator 202, which consists of the standard combination of an LED in close proximity to a phototransistor. Generally, NAND gate 207 is enabled to drive a bank of relay drivers in the form of NAND gate 210a, 210b, 210c and 210d whenever the output of the opto-isolator 202 indicates that the instantaneous voltage from the heater power source 75 is zero, or at least no greater than 20 volts. As will be discussed hereinafter, NAND gate 207 does not actually drive these relay drivers until it also receives a signal from the solid-state relay circuit 98 indicating that the relay 186 has disconnected the heater power source 75 from the mechanical relay circuit 97. In the preferred embodiment, the commercial components forming the zero-voltage detector are as follows:

| | |
| --- | --- |
| Resistor 192 | 25,000 ohms, 10 watts |
| Diode 195 | IN 457 |
| Diode 196 | IN 457 |
| Diode 197 | IN 457 |
| Diode 198 | IN 457 |
| Resistor 199 | 20,000 ohms, .25 watt |
| Zener diode 200 | IN 4370 |
| Resistor 201 | 100 ohms, .1 watt |
| Opto-isolator 202 | Model 4N26-1 (Motorola) |
| Resistor 203 | 1,000 ohms, .1 watt |
| NAND gate 204 | SN 5438-1 |
| LED 205 | CM4-84B-2, .1 watt |
| Resistor 206 | 330 ohms, .1 watt |
| NAND gate 207 | SN 7400 |
| Schmitt Trigger 208 | SN 7414-3 |
| Retriggerable Monostable Multivibrator 209 | SN 74123 |
| Open Collector NAND Gate Drivers 210A, 210B, 210C and 210D | SN 7438-2, SN 7438-3, SN 74378-4 and SN 7438-5 |

Null Command Circuit 106

The null command circuit 106 consists of a pulse generator 211 which closes a relay 213 at the beginning of every monitoring period. The relay 213 in turn actuates the nulling circuit (not shown) within the eddy current generator and detector 82 by switching it to a 5 volt potential for 200 milliseconds. This 200 millisecond pulse of voltage effectively brings the adjustable impedance bridge to balance within the circuit 82. In the preferred embodiment, the null command circuit 106 is formed from the following commercially available components:

| | |
| --- | --- |
| Retriggerable Monostable Multivibrator 211 | SN 74123 |
| Open Collector NAND Gate 212 | SN 7438-6 |
| Relay 213 | Model 1B001346, from Clare Division of General Instrument Corp., Chicago, Illinois |

Mechanical Relay Circuit 97

Turning now to FIG. 6F, mechanical relay circuit 97 is preferably formed from four mechanical relays 215a, 215b, 215c and 215d connected in parallel for eddy current detection and in series for the brazing process. Mechanical relays are preferred over solid-state relays in order to minimize the voltage drop and noise level when the relays conduct an eddy current signal through the coils 21a and 21b. To eliminate noise and pitting, each of these relays preferably has mechanical contacts formed or at least plated with gold or silver. While a single mechanical relay could be used in lieu of four relays connected in parallel, the use of four relays in the configuration shown shortens the time needed for the mechanical relay circuit 97 to connect or disconnect the coils 21a, 21b of the heater assembly 1 to the heater power source 75, since small relays generally offer faster switching properties than large relays. This maximizes the time available for the monitoring periods, and thereby minimizes the chances of a melt condition occurring during a change of state in the mechanical relay circuit 97. As is evident from the schematic diagram, the mechanical relay circuit 97 includes an arrangement of various thyristors 218 through 224, back-to-back zeners 227 and 228, and fuse pairs 230 and 231 to prevent the relatively high-powered current from the heater power source 75 from accidentally flowing into the eddy current generator and detector 82 of the eddy current circuitry 80.

In the preferred embodiment, the following commercially available components are used in the mechanical relay circuit 97:

| | |
| --- | --- |
| Relays 215a, 215b, 215c and 215d | Model KRP11D6, from Potter-Brumfield Corp., Princeton, N.J. |
| Thyristor 218 | Model 1301GEJ9, from General Electric Corp., Schenectady, N.Y. |

-continued

| | |
|---|---|
| Thyristor 219 | Model 1301GEJ9 |
| Thyristor 220 | Model 1301GEJ9 |
| Thyristor 221 | Model 1301GEJ9 |
| Thyristor 222 | Model 1301GEJ9 |
| Thyristor 223 | Model 1301GEJ9 |
| Thyristor 224 | Model 1301GEJ9 |
| Back-to-Back Zener 227 | Two 15-v. zener diodes |
| Back-to-Back Zener 228 | Two 15-v. zener diodes |
| Fuse Pair 230 | 1 amp fuse |
| Fuse Pair 231 | 1 amp fuse |

Pre-Set Circuit 240

FIG. 6G schematically illustrates the pre-set circuit 240. The general purpose of the pre-set circuit 240 is to prevent any of the various circuits from commencing their operation until a stable power condition is sensed. The principal components of this circuit are the edge-triggered flip-flop 241, and the two diodes 242 and 243 which are serially connected between a 5-volt potential in the input of the flip-flop 241. The voltage drop across the two diodes 242 and 243 insures that the control circuit power source must have a stable operating potential on power up or down of at least 5 volts or the flip-flop 241 will not generate a pre-set signal which is necessary for the operation of all of the other principal circuits of the control circuit 95. In the preferred embodiment, the commercially available parts forming the pre-set circuit may be described as follows:

| | |
|---|---|
| Edge Triggered Flip-Flop 241 | SN 7474 |
| Diode 242 | IN 457 |
| Diode 243 | IN 457 |
| Resistor 244 | 1,000 ohms, .1 watt |
| Resistor 245 | 1,000 ohms, .1 watt |
| Manual Button Switch 246 | |
| Schmitt Trigger Inverter 247 | SN 7414-1 |
| Open Collector NAND Gate 248 | SN 7438 |
| Inverters 249a and 249b | SN 7404; SN 7414-2 |

The operation of the control circuit 95 may best be understood by tracing the path of the command pulses from the eddy current enable circuit 110 all the way through to the mechanical relay circuit 97 and null command circuit 106. Turning back to FIG. 6A, the operator actuates the enable circuit 110 by depressing the push-button switch 112. The resulting signal is transmitted through Schmitt trigger 116 and into the two parallel cables leading into the two inputs of NAND gate 126. NAND gate 126 in turn generates a signal, which will be designated herein as "clear counting circuit", or CNTCLR. This CNTCLR signal is transmitted simultaneously to the upper leg of NOR gate 130 of the clearing circuit 128, as well as to the input end of inverter 136 of the loading circuit 135. As is evident in FIG. 6A, the output signals of both the clearing circuit 128 and the loading circuit 135 (designated CLR and LOAD, respectively) are both connected in parallel to the counters 143, 144 and 145 of the count-down circuit 142. However, because capacitor 139 delays the LOAD signal generated by the loading circuit 135 as it travels through inverters 136, 137 and 138, the CLR signal from the clearing circuit 128 arrives at the inputs of the counters 143, 144 and 145 before the LOAD signal from the loading circuit arrives. Such sequencing is, of course, necessary in order for the counters 143, 144 and 145 to properly clear, load and store the iteration and monitoring time information contained within the digital switches 148 and 170.

Timing circuit 150 shown in FIG. 6B regulates the rate at which the information stored in the counter circuits 143, 144 and 145 is processed into signals which change the state of the mechanical relay circuit 97 and the solid-state relay circuit 98. The output signal of the timing circuit 150, which will be designated herein as the "count clock" or CNTCLK is serially fed into the inputs of the counters 143, 144 and 145, while the output signal of the count-down circuit 142, which will be designated as "maximum count", or MAXCNT, is fed into one of the inputs of NOR gate 151 of the counting circuit 150. The foregoing arrangement insures that the counters 143, 144 and 145 will continue to release switching information to the relay circuits 97 and 98 until a maximum count, or the last iteration of the method is reached, whereupon the count-down circuit 142 will release no further switching instructions.

Turning now to FIG. 6D, the solid-state relay circuit 98 includes the solid state relay 186 whose conductive state is dependent upon the signals transmitted from NAND gate 185, which will be designated herein as SWECR, for "switch eddy current relay". The legs of NAND gate 185 are in turn connected to the previously mentioned digital switch 170 through a battery of parallel inverters 171, as well as to the MAXCNT signals generated by the count-down circuit 142. The solid-state relay 186 will open whenever it receives an SWECR signal from the NOR gate 185, which in turn will disconnect the relatively high powered alternating current flowing into the coils 21a, 21b via mechanical relay circuit 97 from the heater power source 75. It should also be noted that the SWECR signal generated by the NAND gate 185 is further connected to the NAND gate mechanical relay drivers 210a, 210b, 210c and 210d via capacitor 188, Schmitt triggers 189 and 190, NAND gate 207, Schmitt trigger 208, and one-shot 209. The provision of the one-shot 209 between the output of the NAND gate 185 and the inputs of the mechanical relay driving NAND gates 210a, 210b, 210c and 210d insures that these NAND gate drivers will not change the state of their respective mechanical relays 215a, 215b, 215c and 215d before the solid-state relay has had an opportunity to disconnect the heater power source 75 from the inputs of the mechanical relays 215a, 215b, 215c and 215d in the mechanical relay circuit 97.

In the preferred embodiment, the delay set in the one-shot 209 is approximately 100 milliseconds, which gives sufficient time for the solid-state relay 186 to completely break the circuit between the heater power source 75 and the mechanical relays in the mechanical relay circuit 97. In the alternative, it should be noted that the same desirable result (i.e., that of breaking the contacts of the mechanical relays 215a, 215b, 215c and 215d only when the power flowing from the heater power source 75 is at or near zero) could be obtained solely by the phototransistor within the opto-isolator 210 working in conjunction with the full-wave rectifier formed by the bridge circuit 194. However, the provision of both a delay circuit (in the form of pulse generator 209) as well as a zero-voltage detector (in the form of opto-isolator 202) provides an added margin of insurance against the mechanical contacts of the relays 215a, 215b, 215c and 215d from breaking, and arcing, as a result of relatively high current power flowing therethrough from the heater power source 75.

As is evident from FIGS. 6D and 6E, the SWECR signal transmitted out of NAND gate 185 is also connected to the null command circuit 106 via inverter 187, capacitor 188, Schmitt triggers 189 and 190, NAND gate 207, and Schmitt trigger 208. Upon receipt of this signal, the pulse generator 211 in this circuit closes the relay 213 for a period of approximately 200 milliseconds, which has the effect of actuating the nulling circuit (not shown) in the eddy current generator and detector 82 for this same period of time. By simultaneously actuating the pulse generators 209 and 211 of the zero-voltage detector 104 and the null command circuit 106, the eddy current circuit 80 is brought to a null, balanced condition in the minimum amount of time possible from the time that the SWECR signal is transmitted by the inverter 187.

Preferred Method of the Invention

With reference now to the flow chart in FIG. 7, the first step 250 of the preferred method of the invention is to electrically connect the coils 21a, 21b of the heater assembly 1 to the heater power source 75 through the mechanical relay circuit 97, and the solid-state relay circuit 98. As is indicated by the question block 252, the operator maintains this electrical connection for a period of three minutes, during which time the coils 21a, 21b generate a sufficient amount of radiant heat to begin to soften the ring of brazing material 74 located between the outer walls of the sleeve 72 and the inner wall of the tube 72 (see FIG. 5). Steps 250 and 252 are designated in phantom since they are preferably manually performed steps, in contrast to the automatically performed steps 254 through 284 implemented by the timing circuit 100 of the control circuit 95.

After three minutes have elapsed, the operator proceeds to block 254, and actuates the timing circuit 100 of the control circuit 95. Almost immediately thereafter, the timing circuit 100 proceeds to steps 256 and 258, and commands the solid-state relay circuit 98 to open (thereby breaking the connection between the heater power source 75 and the mechanical relay circuit 97) and further actuates the null command circuit 106. Almost instantly thereafter, the timing circuit transmits a pulse to actuate the mechanical relay circuit 97. However, because of the previously described function of the pulse generator 209 in delaying the transmission of this signal to the NAND gate mechanical relay drivers 210a, 210b, 210c and 210d, as well as the zero (or at least low) voltage condition incorporated into the logic by the action of the phototransistor in the opto-isolator 202, the control circuit 95 will not immediately proceed to command the mechanical relays 215a, 215b, 215c and 215d to change state. Such a change of state will occur only after 200 milliseconds have elapsed and the voltage flowing through these relays is equal to or less than 20 volts, as indicated by inquiry blocks 260 and 262. However, immediately upon determining that both of the inquiries in blocks 260 and 262 have been answered in the affirmative, the control circuit 95 proceeds to step 264 and changes the state of the mechanical relay circuit 97 which electrically connects the coils 21a, 21b to the output of the eddy current generator and detector 82.

After 200 milliseconds have elapsed from the time at which the clock circuit 150 of the timing circuit 100 was actuated, the pulse generator 211 proceeds to deactuate the null command circuit 106, as indicated by blocks 266 and 268. As previously described, the implementation of step 268 insures that the impedances between the coils 21a and 21b are perfectly balanced at the start of the monitoring period. In the next step of the method, represented by block 270, changes in the impedances of the coils 21a, 21b are then monitored for a time period of three seconds, as indicated by inquiry block 272. This block of the process is not implemented by the control circuit 95, but by the eddy current circuitry 80. Step 270 of the method is best implemented by the strip recorder 90, since this recorder provides a visual presentation of the rate of change of impedance in one or both of the coils over time. This is important, since the slope of the resulting impedance-over-time curve provides a positive indication of the rate at which the material forming the ring of brazing material 74 is flowing into the annular gap between the outer wall of the sleeve 72 and the inner wall of the tube 70. Also, depending upon the sign of the slope of the curve generated by the strip recorder 90 (which would indicate the polarity of the differential current flowing out of the impedance bridge in the eddy current generator and detector 82), the direction of flow of the braze material along the longitudinal axis of the sleeve/tube combination may be determined.

After three seconds have elapsed (which occurs when the answer to inquiry block 272 is "yes"), the control circuit 95 proceeds to step 274 and commands the mechanical relay circuit 97 to again change state, thereby preparing the way for again electrically engaging the coils 21a, 21b to the heater power source 75. While different lengths of monitoring periods may be used in the method of the invention, time periods of three seconds are preferred because they are long enough to minimize the chances of a melt condition occurrent between monitoring periods, but no so long as to allow the sleeve/tube combination to undergo any significant cooling. After implementing step 274, the control circuit 95 proceeds to step 276, and commands the solid-state relay circuit 98 to close, thereby reconnecting the coils 21a, 21b to the heater power source 75. However, as the mechanical contacts of the relays 215a, 215b, 215c and 215d are already closed at this juncture, there is no danger of any arcing in these contacts when the solid-state relay circuit 98 closes.

As is indicated by inquiry block 278, the heater power source 75 is engaged to the coils 21a, 21b for a period of approximately four seconds. This is a sufficient amount of time for the coils 21a, 21b to generate enough radiant heat to actually raise the temperature of the inside of the sleeve 72 to a higher point than it was before the coils 21a, 21b were initially disconnected from the heater power source 75. The raising of the temperature of the sleeve 72 will enhance the probability that a melt condition will occur in the material of brazing ring 74 if it has not already occurred.

As indicated in steps 280, 282 and 284, the timing circuit 100 will reiterate the steps 256 through 278 for a selected maximum number of iterations (which is sixteen in the preferred embodiment) before proceeding to shut down. The inventors have found that, so long as the monitoring periods are no longer than about three and one-half seconds and the heating times are at least four seconds (after the initial three-minute heating time has expired), the probability of a melt condition occurring some time within the 16 iterations is equal to one under normal operations. While a definite number of iterations are used in the preferred method of the invention, an alternative method would be to stop the iterations immediately upon detection of a melt condition in the ring of brazing material 74.

I claim as my invention:

1. A method of using the electrical resistance element of a radiant heater assembly to determine when the brazing heat generated by the electrical resistance element melts an electrically conductive brazing material disposed on the outside surface of a conduit, comprising the steps of:
   (a) positioning the electrical resistance element inside the conduit in the vicinity of the brazing material;
   (b) electrically connecting the resistance element first to a heater power source in order to generate a brazing heat, then disconnecting the resistance element from the heater power source, and finally connecting the resistant element to a source of relatively low power alternating current in order to induce eddy currents in the brazing material;
   (c) monitoring changes in the impedance of the element while the low power alternating current flows therethrough, and
   (d) noting when the impedance of the element changes.

2. The method of claim 1, wherein the heating element is a coil wound around the longitudinal axis of the heater and assembly, further including the step of detecting the rate at which the brazing material melts by monitoring the rate of change in the impedance of the coil.

3. The method of claim 1, wherein the electrical resistance element includes first and second coils separately connected in parallel to the output of the low power alternating current in order to form a differential eddy current coil.

4. The method of claim 3, wherein one of the coils is wound clockwise around the longitudinal axis of the heater assembly, and the other is wound counter-clockwise, and further including the step of determining in which direction the brazing material melts along the longitudinal axis of the heater assembly by monitoring the polarity of the differential output current.

5. The method of claim 3, further including the step of adjusting the differential output current of the differential eddy current coil to zero before monitoring changes in the differential impedance of the coil while the low power alternating current flows therethrough.

6. The method of claim 1, further including the step of selecting the frequency of the low power alternating current so as to maximize the amount of electromagnetic coupling which occurs between the brazing material and the heating element.

7. The method of claim 1, further including the step of selecting the frequency of the low power alternating current somewhere within the range between 15 kHz and 20 kHz.

8. The method of claim 1, wherein the electrical connecting and disconnecting of step (b) is implemented by a relay having contacts, and wherein the heater power source is deactuated before the relay disconnects the heater power source from the electrical resistance element in order to avoid arcing in the relay contacts.

9. The method of claim 1, wherein the heater power source provides relatively high power alternating current and wherein the electrical connecting and disconnecting referred to in step (b) is implemented by means of a relay having contacts, and wherein the instantaneous time of disconnection between the electrical resistance element and the heater power source in step (b) is chosen so that the instantaneous voltage flowing through the electrical resistance element is no higher than about 20 volts, in order to avoid arcing in the contacts.

10. The method of claim 1, wherein the period of time that the heating element is connected to the low power alternating current is selected so that no substantial temperature drop occurs in the brazing material between the time that the heating element is disconnected and reconnected to the heater power source.

11. The method of claim 10, wherein the heating element is connected to the low power alternating current for no more than about four seconds.

12. A method of using the electrical resistance coil of a radiant heater assembly during a brazing operation to determine when the coil melts an electrically conductive brazing material disposed on the outside of a sleeve disposed within a tube, comprising the steps of:
   (a) positioning the heating coil inside the sleeve in the vicinity of the brazing material;
   (b) electrically connecting the heating coil first to a heater power source in order to generate a brazing heat, disconnecting the heating coil from the heater power source, and then connecting the heating coil to a source of relatively low power alternating current in order to induce eddy currents in the brazing material;
   (c) monitoring changes in the impedance of the coil while the low power alternating current flows therethrough;
   (d) repeating steps (b) and (c) until a substantial change in the impedance of the coil is detected, and
   (e) noting when the impedance of the coil changes substantially.

13. The method of claim 12, further including the step of using the heating coil to determine the rate at which the brazing material melts by monitoring the rate of change in the coil impedance.

14. The method of claim 12, wherein the electrical resistance coil includes first and second coils separately connected in parallel to the output of the low power alternating current in order to form a differential eddy current coil.

15. The method of claim 14, wherein one of the coils is wound clockwise around the longitudinal axis of the heater assembly, and the other is wound counter-clockwise, and wherein the outputs of the first and second coils are connected across the opposite ends of an impedance bridge circuit, and further including the step of determining in which direction the brazing material melts along the longitudinal axis of the heater assembly by monitoring the polarity of the resulting alternating current flowing across the impedance bridge circuit.

16. The method of claim 15, further including the step of adjusting the impedances in the impedance bridge circuit so that there is initially no resultant alternating current flowing across said bridge circuit at the beginning of each time the coil is monitored.

17. The method of claim 12, further including the step of selecting the frequency of the low power alternating current so as to maximize the amount of electromagnetic coupling which occurs between the brazing material and the heating coil.

18. The method of claim 12, wherein the electrical connecting and disconnecting the step (b) is implemented by a relay having contacts, and wherein the heater power source is deactuated before the relay disconnects the heater power source from the electrical resistance element in order to avoid arcing in the relay contacts.

19. The method of claim 12, further including the step of selecting the frequency of the low power alternating current somewhere within the range between 15 kHz and 20 kHz.

20. The method of claim 12, wherein the heater power source provides relatively high power alternating current, and wherein the instantaneous time of disconnection between the coil and the heater power source in steps (b) and (c) is chosen so that the instantaneous voltage flowing through the coil is no higher than about 20 volts, in order to avoid arcing.

21. The method of claim 20, wherein the time period between the disconnection and reconnection of the coil and the heater power source in steps (b) and (c) is chosen so that there is no substantial loss in temperature of the brazing material being melted.

22. The method of claim 21, wherein said time period is no greater than about four seconds.

23. A method of using the electrical resistance coil of a radiant heater assembly during a brazing operation to determine when the coil melts a ring of electrically conductive brazing material which circumscribes the outside surface of a reinforcing sleeve concentrically disposed within a tube, wherein the electrical resistance coil is formed from first and second serially-connected coils, one of which is wound clockwise around the longitudinal axis of the heater assembly, and the other of which is wound counter-clockwise, comprising the steps of:
- (a) positioning the coil inside the sleeve in the vicinity of the ring of brazing material so that the connection between the first and second serially-connected coils is adjacent the ring of brazing alloy;
- (b) electrically connecting the coil to a relatively high power alternating current in order to generate a brazing heat in the sleeve in the vicinity of the ring of brazing material;
- (c) electrically disconnecting the coil from the relatively high power alternating current;
- (d) electrically connecting the inputs of both the first and second coils which make up the heating coil to a source of low power alternating current and the outputs across an impedance bridge circuit in order to monitor impedance changes in either the first or second coils by monitoring the differential current output traveling across the impedance bridge circuit;
- (e) adjusting the impedance bridge circuit at the beginning of step (d) so that the initial differential current output is zero;
- (f) monitoring the differential current output to determine the time that the melting occurs, and the rate and direction of the melting along the longitudinal axis of the radiant heater assembly by monitoring the time at which any significant differential current flows across the impedance bridge, and the rate of change and the polarity of the current, respectively;
- (g) repeating steps (b), (c), (d), (e) and (f) until a significant differential current flows across the impedance bridge.

24. A radiant heater assembly for selectively applying heat to a brazing material located on the outside of a conduit, and for detecting when this brazing material melts, comprising:
- (a) a heating coil including first and second coils, wherein said first and second coils are wound clockwise and counter-clockwise, respectively, around the longitudinal axis of the radiant heater assembly;
- (b) a heater power source which is electrically connectable across the first and second coils;
- (c) an eddy current circuit which is electrically connectable across each of the coils so that the first and second coils function as a differential current eddy current coil whenever said electrical connection is made, and
- (d) a control circuit for automatically alternately connecting said first and second coils first to said heater power source, and then to said eddy current circuit until changes in the differential current generated by the first and second coils indicate that said brazing material has melted.

25. The radiant heater assembly of claim 24, wherein said control circuit includes a timing circuit for controlling the amount of time that said first and second coils are connected to said heater power source and said eddy current circuit.

26. The radiant heater assembly of claim 24, wherein said heater power source provides a relatively high power current, and wherein said control circuit includes a relay for deactuating the power source prior to the disconnection of the power source from the first and second coils in order to avoid arcing.

27. The radiant heater assembly of claim 24, wherein said heater power source provides relatively high power alternating current, and wherein said control circuit includes a zero voltage detector for implementing the disconnection of the first and second coils from the power source when the instantaneous voltage is low in order to avoid arcing.

28. The radiant heater assembly of claim 24, wherein said control circuit includes a relay for connecting and disconnecting said heater power source to said first and second coils, wherein said relay includes contacts formed from a nobel metal in order to reduce pitting and noise.

29. The radiant heater assembly of claim 24, wherein said eddy current circuit includes a nulling circuit for adjusting the differential current generated by the first and second coils to zero, and wherein said control circuit includes a null command circuit electrically connected to said nulling circuit for actuating said nulling circuit every time the first and second coils are electrically connected to said eddy current circuit.

30. A radiant heater assembly for selectively applying a brazing heat to a ring of brazing material circumscribing a reinforcing sleeve which is concentrically disposed within a tube, and for detecting when this ring of brazing material melts between the annular space between the sleeve and the tube, comprising:
- (a) a heating coil formed from first and second coils, wherein said coils are wound clockwise and counter-clockwise around the longitudinal axis of the heater assembly, respectively, and wherein each coil includes an input lead and an output lead;
- (b) a heater power source for providing a relatively high power alternating current across said heater coil, wherein said power source is electrically connectable across each of said first and second coils;
- (c) an eddy current circuit including a generating circuit for generating a relatively low power alternating current which is electrically connectable to the input leads of the first and second coils, an adjustably impedance bridge circuit electrically connectable across the output leads of the first and second coils for generating a differential current, a nulling circuit for adjusting the differential current to zero, and a monitoring circuit for generating a visual presentation of the magnitude, rate of change, and resultant polarity of the differential current, and (d) a control circuit for cyclically connecting and disconnecting said first and second coils to the heater power source and to the eddy current circuit, respectively, until said monitoring circuit generates a visual signal indicative of a melting condition of the ring of brazing material, wherein said control circuit includes a timing circuit for controlling the amount of time said coils are connected to said heater power source and said eddy current circuit for each cycle of connections, and a null command circuit for actuating the nulling circuit of the eddy current circuit every time the coils are connected to the nulling circuit.

31. The radiant heater assembly of claim 30, wherein the timing circuit is adjustable so that the various connection times of each cycle may be varied.

32. The radiant heater assembly of claim 30, wherein the monitoring circuit generates a visual signal indicative of the magnitude, rate of change, and polarity of the differential current in order that the time, rate and direction of the melt along the longitudinal axis of the heater assembly may be ascertained.

33. The radiant heater assembly of claim 32, wherein the monitoring circuit is a strip recorder.

* * * * *